United States Patent
Valizadeh

[11] Patent Number: 5,838,994
[45] Date of Patent: *Nov. 17, 1998

[54] METHOD AND APPARATUS FOR THE DYNAMIC ALLOCATION OF BUFFERS IN A DIGITAL COMMUNICATIONS NETWORK

[75] Inventor: Homayoun S. Valizadeh, San Ramon, Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 583,987
[22] Filed: Jan. 11, 1996
[51] Int. Cl.⁶ .................................................... G06F 13/00
[52] U.S. Cl. .................. 395/876; 395/872; 395/825; 395/873; 395/200.61; 395/200.45; 395/601; 395/495; 395/250; 395/456; 395/200; 370/236; 364/900; 711/171
[58] Field of Search ................................ 395/200.61, 76, 395/200.45, 601, 495, 873, 825, 876, 200, 456, 250, 872, 497.02; 370/236; 364/900; 711/171

[56] References Cited

U.S. PATENT DOCUMENTS

| | | | |
|---|---|---|---|
| 4,258,418 | 3/1981 | Heath | 395/873 |
| 4,445,176 | 4/1984 | Burk et al. | 395/200.61 |
| 4,603,382 | 7/1986 | Cole et al. | 395/76 |
| 4,783,730 | 11/1988 | Fischer | 395/825 |
| 5,014,265 | 5/1991 | Hahne et al. | 370/236 |
| 5,046,039 | 9/1991 | Ugajin et al. | 364/900 |
| 5,179,665 | 1/1993 | Roslund et al. | 395/200.45 |
| 5,405,511 | 4/1995 | Notarianni | 395/601 |
| 5,412,781 | 5/1995 | Lukas et al. | 395/200 |
| 5,432,908 | 7/1995 | Heddes et al. | 395/495 |
| 5,524,214 | 6/1996 | Kurihara | 395/250 |
| 5,537,635 | 7/1996 | Douglas | 395/456 |
| 5,600,820 | 2/1997 | Johnston | 395/497.02 |
| 5,682,553 | 10/1997 | Osborne | 395/876 |
| 5,784,698 | 7/1998 | Brady et al. | 711/171 |

OTHER PUBLICATIONS

F. Kamoun, "Analysis of Shared Finite Storage In a Computer Network Node Envionment Under General Traffic Conditions," IEEE Tran. on Comm., vol. Com. 28, No. 7, Jul. 1980, pp. 992–997.

S. Lam, "Store–and–Forward Buffer Requirements In a Packet Switching Network," IEEE Tran. on Com., vol. Com. 24, No. 4, Apr. 1976, pp. 394–403.

Kamoun Farouk, "Design Considerations for Large Computer communication Networks," pp. 1–388, University of California, Los Angeles, Dissertion for Degree of Doctor of Philosophy in Computer Science (1976).

*Primary Examiner*—Wayne Amsbury
*Assistant Examiner*—Thuy Pardo
*Attorney, Agent, or Firm*—Blakely, Sokoloff, Taylor & Zafman

[57] ABSTRACT

A method for managing buffer memory in a communications controller that transmits data over a plurality of channels wherein the buffer memory comprises a memory space of $B_{total}$. A first subset of the memory space $B_{total}$ is location to queues associated with each of the plurality of channels. A second subset of the memory space $B_{total}$ is reserved for allocation to queues associated with channels that are activated to transmit data. Any remaining memory space from the memory space $B_{total}$ is specified as free for allocation to any queue associated with a channel that is activated to transmit data.

14 Claims, 9 Drawing Sheets

QUEUEING PARAMETERS 87

| QUEUE DEPTH $N_{USED}$ 115 | TARGET QUEUE DEPTH $(N_{FIXED} + N_{RSVD})$ 120 | MAXIMUM QUEUE DEPTH $(N_{FIXED} + N_{RSVD} + N_{FREE})$ 125 | OTHER PARAMETERS 130 |
|---|---|---|---|

FIG. 7

METHOD AND APPARATUS FOR THE DYNAMIC ALLOCATION OF BUFFERS IN A DIGITAL COMMUNICATIONS NETWORK

FIELD OF THE INVENTION

The present invention relates generally to buffer management and more particularly to a method and apparatus for the dynamic allocation of buffers in a digital communications network.

BACKGROUND

Interconnecting two data processing systems that operate independently of one another typically entails the use of buffers to store and forward data that are to be exchanged by the systems. Communications controllers that interconnect high speed, high capacity systems require large amounts of high speed memory for buffering, which increases the cost of communications controllers. The efficient use of buffer memory is therefore desirable to reduce the cost of communications controllers.

For high speed telecommunications switches, a communications controller that interconnects a high speed cell switched or packet switched common carrier network with private networks, the need for efficient use and management of buffer memory is made apparent by the large number of logical communications channels that may be provided per physical link. For example, several T1 lines may be used to connect a private networks (commonly called customer premises equipment or "CPE") to a telecommunications switch in order to allow a users of the private networks to access the common carrier network. A T1 line is operated in a time division multiplexed manner and can have a maximum of twenty-four logical channels active at a time.

To provide for the scalability of the telecommunications switch, the switch manufacturer typically provides a buffer queue for each possible logical channel. For example, if twenty-four logical channels are provided in the switch, the buffer memory space will be partitioned into twenty-four sections of equal size. According to prior buffer management schemes, if a logical channel is not used ("deactivated"), that portion of the buffer memory space reserved for queuing data received from the deactivated logical channel will go unused. It would be desirable to be able to allocate the unused buffer memory space of deactivated logical channels in order to better utilize available memory and increase the maximum queue length of queues and thereby help prevent the loss of data received from activated logical channels.

SUMMARY AND OBJECTS OF THE INVENTION

Therefore, it is an object of the invention to provide a mechanism for dynamically allocating buffer memory space in a communication module of a communications network.

This and other objects of the present invention are provided by a method for managing buffer memory in a communications controller that transmits data over a plurality of channels wherein the buffer memory comprises a memory space of $B_{total}$. A first subset of the memory space $B_{total}$ is reserved for allocation to queues associated with each of the plurality of channels. A second subset of the memory space $B_{total}$ is reserved for allocation to queues associated with channels that are activated to transmit data. Any remaining memory space from the memory space $B_{total}$ is specified as free for allocation to any queue associated with a channel that is activated to transmit data.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 7 shows queuing parameters for use by one embodiment.

DETAILED DESCRIPTION

Figure 1:
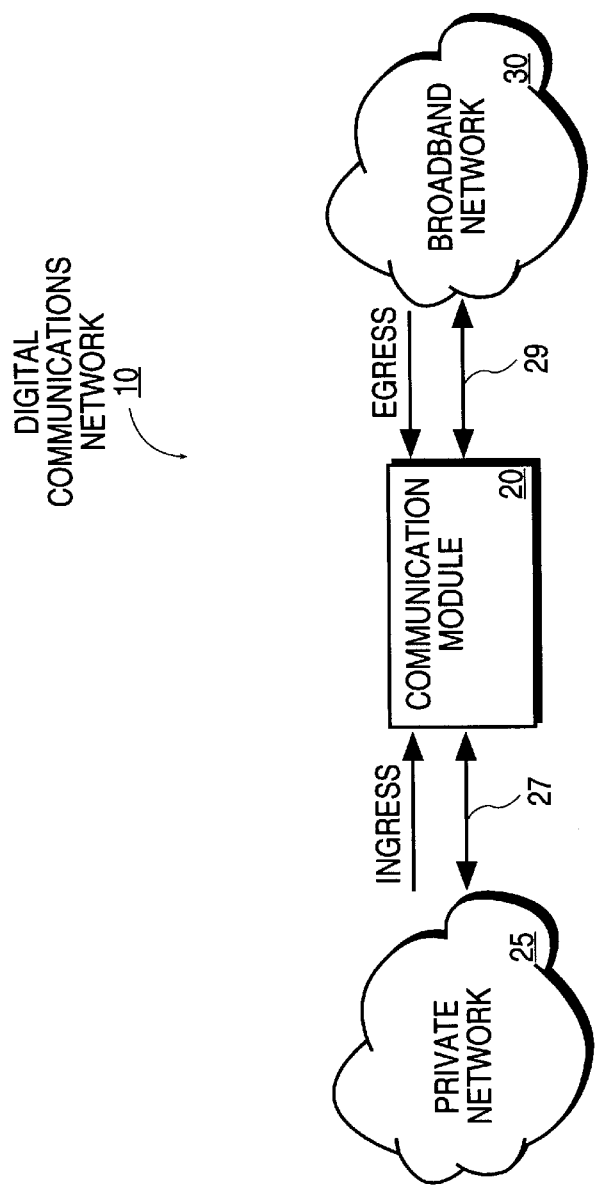
FIG. 1 shows a digital communications network that operates according to one embodiment.

A buffer management scheme for use in a communications controller is described wherein the unused memory space normally reserved for the queues of deactivated logical channels are made available for allocation to the queues of activated logical channels. According to the present embodiments the buffer memory space is generally divided into a portion that is specifically reserved for allocation to particular queues and a portion that is free for allocation to any queue, depending on whether all of the logical channels serviced by the communications controller are activated for transmission. If all of the logical channels serviced by the communications controller are activated, the entire buffer memory space is reserved for allocation. If less than all of the logical channels serviced by the communications controller are activated, a portion of the buffer memory space is available for allocation to any queue. In this manner, the effective queue lengths for activated channels may be increased without increasing the overall size of the buffer memory space.

The advantages described herein are achieved, in part, by "partitioning" the buffer memory space into a fixed region, a reserved region, and a common region. The so-called "regions" are intended to describe the manner in which the buffer memory space is utilized and do not necessarily conform to address space. The fixed region comprises a minimum number of buffers (or bytes) specifically reserved for allocation to every buffer queue, regardless of whether the logical channel serviced by the buffer queue is activated or deactivated. Providing a fixed region ensures that some buffering will be provided should a previously deactivated logical channel become activated. The reserved region comprises an additional number of buffers (or bytes) reserved for allocation only to buffer queues that service activated logical channels. According to one embodiment, the size of the reserved region varies dynamically. The fixed region and the reserved region together comprise the "reserved" portion of the buffer memory space. Any buffers (or bytes) that remain are located in the common region of the buffer memory space and are free for allocation to any buffer queue.

The buffer memory space is managed dynamically in view of variations of communications traffic and the actual usage of the buffer memory space. As described below, queuing parameters are provided for each queue, and a set of flags that represent the state of the buffer memory space are also provided. A queuing engine uses the queuing parameters and the set of flags to determine whether buffers may be allocated to a particular queue.

The disclosed methods and mechanisms may be used to dynamically allocate elements, however defined, from a common pool of elements to distinct sets of elements that are each associated with one of several users that share the common pool of elements. Furthermore, the sets of elements need not be managed or serviced in a first in, first out manner. In order to more clearly detail the advantages of the disclosed methods and mechanisms, the elements of the present embodiments are described as "buffers," the sets of elements are described as "buffer queues," and the common pool of elements is described as a "buffer pool."

According to the present embodiments, each buffer queue comprises a linked list of buffers which is serviced in a first in, first out manner. The "buffers" discussed herein are actually memory locations maintained in random access memory (RAM). To simplify discussion, the buffers are assumed to be of a fixed size such that a buffer is synonymous with a predetermined number of bytes of data, and the discussion refers to queuing parameters that reflect the number of buffers in a queue. According to alternative embodiments, the same queuing parameters reflect the number of bytes in a queue.

FIG. 1 shows a digital communications network 10. The digital communications network 10 is shown in a simplified form wherein a communications module 20 provides an entry point for a private network 25 to a broadband network 30. The communications module 20 may be part of a larger communications controller such as a telecommunications switch. For the purposes of simplifying discussion, a single communication module for interconnecting a single private network to the broadband network is shown.

Private network 25 is linked to communication module 20 by a communications line 27, which may be, for example, a T1 or E1 line. According to the present embodiment, private network 25 operates according to the Frame Relay standard protocol promulgated by ANSI, but private network 25 may operate according to any reasonable networking protocol.

Broadband network 30 is coupled to communications module 20 by a communications line 29, which may be, for example, a T1, E1, T3 or E3 line. According to the present embodiment, broadband network 30 operates according to the Asynchronous Transfer Mode (ATM) standard protocol promulgated by the ITU and clarified by the ATM Forum. Broadband network 30 may operate according to an alternative networking protocol such as Frame Relay.

Figure 2:
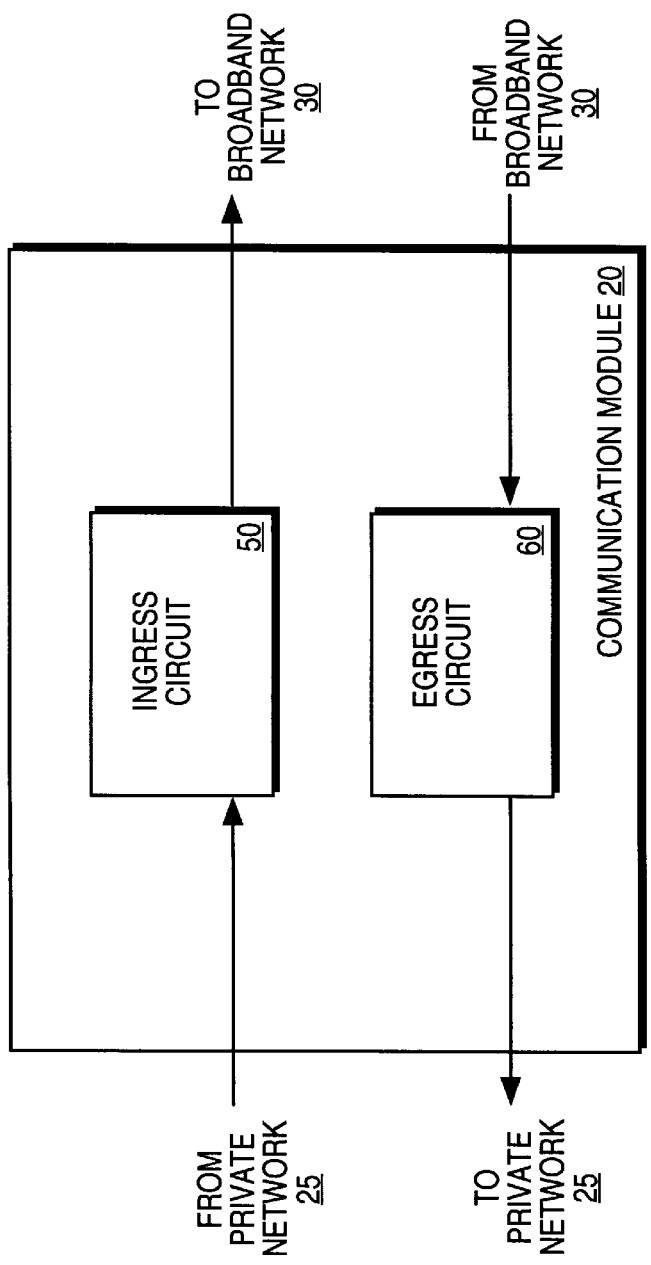
FIG. 2 shows a communications controller that operates according to one embodiment.

Communications module 20 services traffic in both directions between the private network 25 and the broadband network 30. Therefore, as shown in FIG. 2, communications module 20 includes an ingress circuit 50 for servicing ingress communications traffic directed from private network 25 to broadband network 30 and an egress circuit 60 for servicing egress communications traffic directed from broadband network 30 to private network 25. Wherein the ingress circuit 50 an the egress circuit 60 are shown as being logically distinct, much of the services provided by the ingress and egress circuits may be performed by the same physical components.

Figure 3:
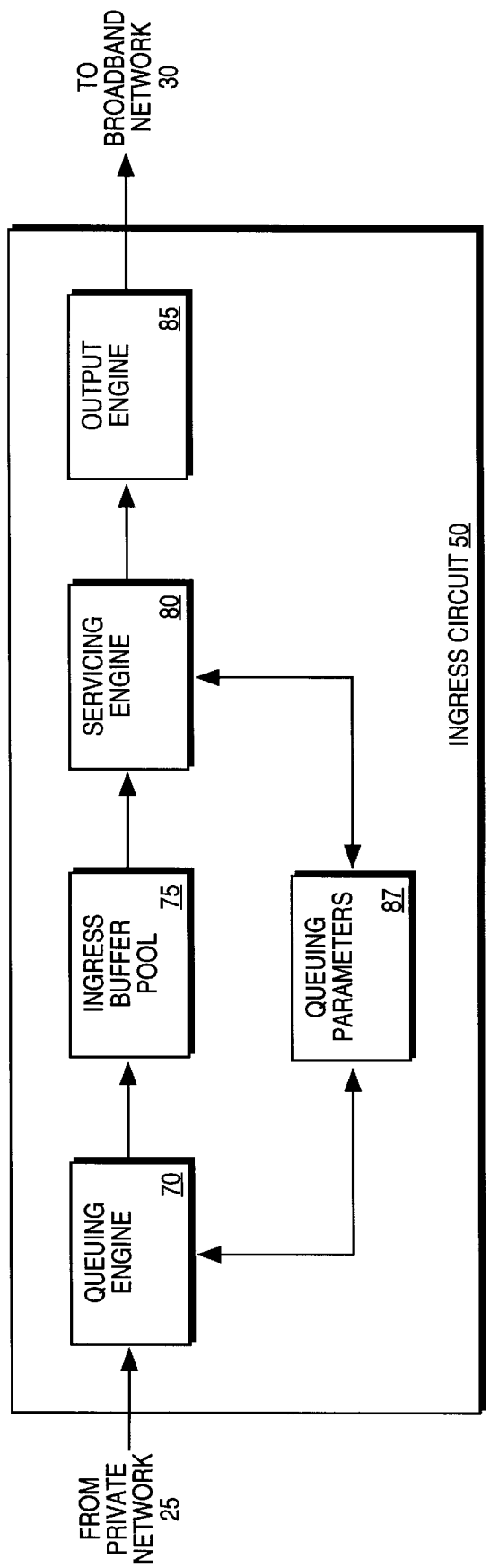
FIG. 3 shows an ingress circuit that operates according to one embodiment.

FIG. 3 shows an ingress circuit in more detail. Ingress circuit 50 includes a queuing engine 70, an ingress buffer pool 75, a servicing engine 80, an output engine 85, and a set of queuing parameters 87. Egress circuit 60 includes similar functional units for performing the same functions in the egress direction.

Ingress circuit 50 receives information from private network 25 and buffers the information for transfer to broadband network 30. Information is typically received from private network 25 as "frames," and queuing engine 70 segments the frames into cells that are each destined for transmission over a particular logical channel (i.e. virtual channel or "VC") of broadband network 30. The functions of the queuing engine 70 may be performed by a microprocessor.

Queuing engine 70 manages the allocation of the buffers of ingress buffer pool 75 according to queuing parameters 87, wherein the ingress buffer pool 75 is logically divided into a set of ingress queues, one for each logical channel of broadband network 30. A separate set of queuing parameters 87 are provided for each ingress queue.

When a cell is presented for queuing, queuing engine 70 determines whether a buffer may be allocated to store the cell in view of 1) the queuing parameters 87 for the ingress queue of the logical channel for which the cell is destined, 2) the current state of that ingress queue, and 3) the current state of the buffer pool 75. This aspect is discussed in more detail below. If a buffer is available for allocation to an ingress queue, queuing engine 70 stores the cell in the buffer and adds the buffer to the ingress queue.

Figure 4:
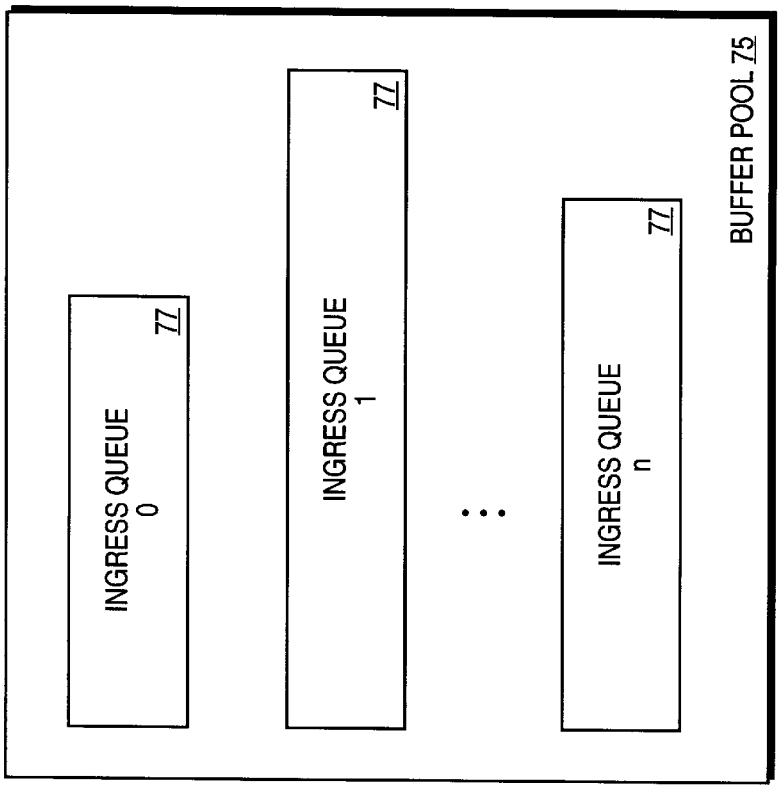
FIG. 4 shows how a buffer pool may be logically divided into a plurality of distinct buffer queues.

Each ingress queue comprises a linked list of buffers that are serviced by servicing engine 80 in a first in, first out manner. Buffers are allocated by queuing engine 70 on an as needed basis, and an ingress queue may be empty (i.e. have no buffers allocated to it). For example, the ingress queues of deactivated logical channels are empty, and the ingress queue of an activated logical channel may become empty under the appropriate circumstances. According to the present embodiment, ingress buffer pool 75 comprises Random Access Memory (RAM), and FIG. 4 shows that the ingress buffer pool is logically divided into a plurality of n distinct ingress queues 77, each corresponding to one of n logical channels. FIG. 4 further shows that the length of different ingress queues will vary depending on actual usage of the corresponding logical channel.

Returning to FIG. 3, servicing engine 80 uses the queuing parameters 87 to service the ingress queues. For example, during each transfer interval of communication link 29, servicing engine 80 generates a service decision that specifies a particular ingress queue. Servicing engine 80 either transfers or drops the contents of the buffer at the head of the selected ingress queue in response to the queuing parameters 87, which are defined in view of the service contract for the user of private network 25. Regardless of whether the contents of a buffer are transferred or dropped, the buffer at the head of the ingress queue is deallocated and freed for further use. Output engine 85 transmits cells to the broadband network 30 using communications link 29.

Figure 5:
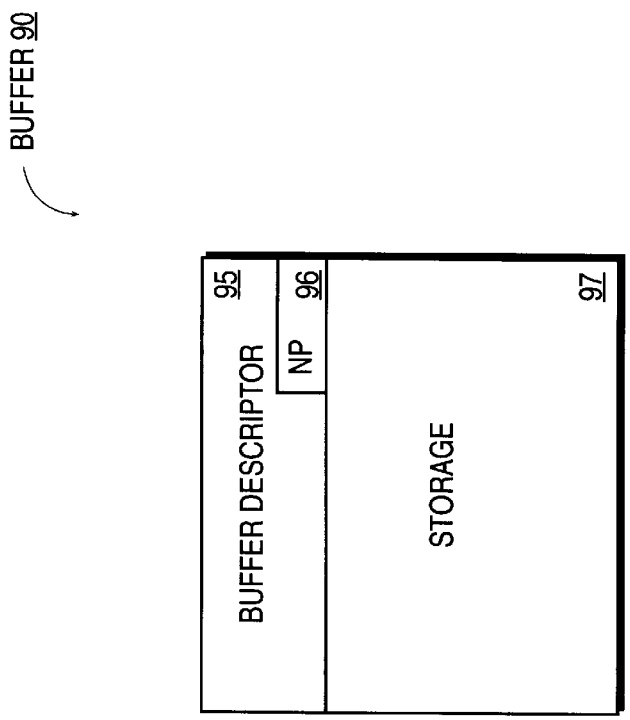
FIG. 5 shows a format of a buffer for use in a buffer queue.

FIG. 5 shows the general format of a buffer used to form ingress queues. The buffer 90 comprises a buffer descriptor 95 and a storage region 97 for storing a cell payload received from queuing engine 70. As described above, each ingress queue comprises a linked list of buffers, and the buffer descriptor 95 of each buffer includes a next pointer (NP) for pointing to the next buffer in the linked list of the ingress queue. When the buffer at the head of an ingress queue is serviced, the buffer indicated by the next pointer is placed at the head of the ingress queue.

Figure 6:
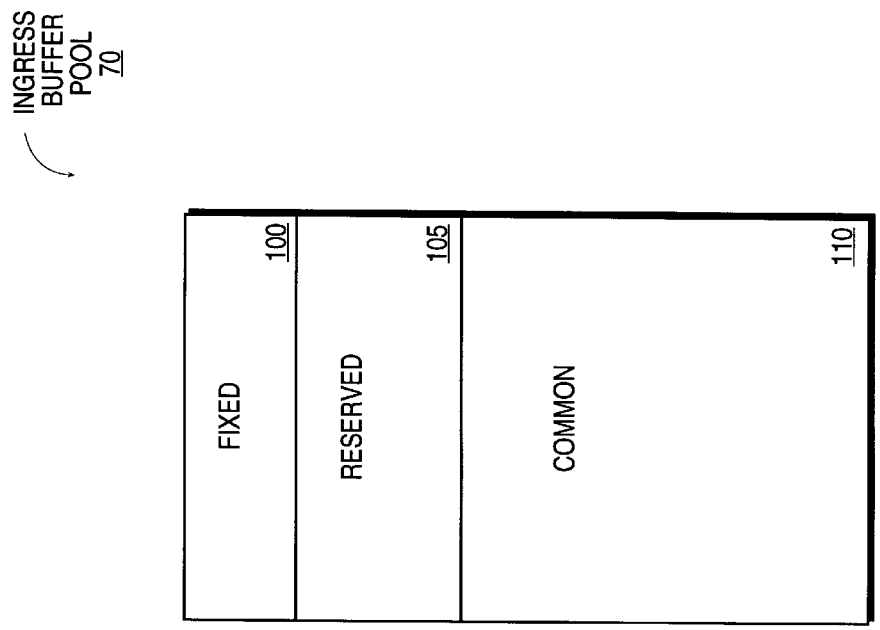
FIG. 6 is a representation of how buffer memory space may be divided into multiple regions according to one embodiment.

FIG. 6 shows the manner in which the memory space of ingress buffer pool may be allocated according to one embodiment. The size of the buffer pool and therefore the amount of buffer memory space is fixed and will be referred to as $B_{total}$. To simplify discussion, it will be assumed that buffer size is fixed and that there are a maximum of 256 logical channels, each having a rate of transmission of 64 kilobits per second (kbps), which may be the case when ingress circuit 50 services a single T1 line to broadband network 30. Because each logical channel has the same rate of transmission, a total of N buffers are provided for each ingress queue, wherein N is the nominal queue depth and is selected in view of typical patterns of data traffic in order to better ensure sufficient buffering under normal traffic conditions. For alternative embodiments, the variable N will refer to the number of bytes, rather than buffers, in a queue.

According to the present embodiment, the memory space of ingress buffer pool 70 is divided into a fixed region 100, a reserved region 105, and a common region 110. The so-called "regions" are intended to describe the manner in which the buffer memory space is utilized and do not necessarily require the partitioning of buffer pool in to distinct regions based on address space. The regions are more properly viewed as the number of buffers that are reserved for allocation or that are free.

The fixed region 100 reserves a predetermined minimum number of buffers for allocation to each possible ingress queue, regardless of whether the logical port of an ingress queue is currently active or inactive. The reserved region 105 reserves an additional number of buffers for allocation to the ingress queues of activated channels such that the target maximum queue length of an active queue is determined by the sum of the number of buffers reserved in the fixed region 100 and the number of buffers reserved in the reserved region 105 for that queue. The common region 110 includes all buffers not otherwise reserved for allocation, and ingress queues may use buffers from the common region 110 such that their actual maximum queue length exceeds the target maximum queue length. The total number of buffers reserved for allocation by the fixed region 100 and the reserved region 105 is expressed as $B_{rsvd}$, and the total number of buffers in (or the size of) the common region 110 is expressed as $B_{free}$, wherein the sum of $B_{rsvd}$ and $B_{free}$ is $B_{total}$. As logical channels are activated and deactivated, the relative sizes of the reserved region 110 and the common region 115 varies such that $B_{rsvd}$ and $B_{free}$ vary.

The size of fixed region 100 is fixed in view of the maximum possible number of logical channels that can be serviced by ingress circuit 50 and the rates of transmission of those logical ports. According to the present example, $N_{fixed}$ buffers are reserved for allocation for each of the 256 logical channels such that the size of the fixed region 100 is 256 times $N_{fixed}$. The number $N_{fixed}$ is selected to provide a minimum allocation of buffers should a previously deactivated logical port become activated. According to alternative embodimetns, $N_{fixed}$ indicates a number of bytes, rather than buffers.

According to the present embodiment, the size of reserved region 105 is based on the number of activated logical channels, the rates of transmission for the activated logical channels, and the Initial Burst Size (IBS) for each of the activated logical channels. The size of the reserved region 105 is not static even if the number of activated logical channels remains the same because the IBS for each active logical channels can change dynamically. Each activated logical channel has a distinct number $N_{rsvdn}$ (n being the number of the active logical channel) of buffers reserved for allocation in the reserved region 105. Servicing engine 80 determines the number of reserved buffers $N_{rsvdn}$ for each activated channel. The total number of buffers reserved for allocation $B_{rsvd}$ is equal to the sum of $N_{fixed}$ for all the logical channels and $N_{rsvdn}$ for all the activated logical channels. According to alternative embodimetns, the number $N_{rsvdn}$ for each activated channel indicates a number of bytes, rather than buffers.

According to an alternative embodiment, the IBS is not used as a factor in reserving buffers for allocation in the reserved region 105, and the number of buffers reserved for allocation to an active ingress queue by the reserved region 105 is determined entirely by the rate of transmission of the corresponding logical channel such that the size of reserved region 105 remains fixed so long as the number of activated logical channels remains the same. Given the present example wherein each logical channel has the same rate of transmission, the number $N_{rsvd}$ would be the same for all activated logical channels.

Buffers of the common region 110, if any are available, are allocated to a particular ingress queue if the target maximum queue length for that queue has been met and additional buffers are needed. If all available logical channels are activated, the common region 110 will essentially be empty, and almost all the buffers of the buffer pool 75 will be reserved for allocation. Some buffers may be free for allocation depending on the number of buffers $N_{fixed}$ reserved for allocation for each logical channel, but the number of buffers N reserved for allocation to each ingress queue when all logical channels are activated is essentially the same for each ingress queue.

If less than all available logical channels are activated, the common region 110 will contain a number of buffers $B_{free}$ that are free for allocation to the ingress queues of activated logical channels. Buffers may be allocated from the common region 110 in any reasonable manner. For example, free buffers may be allocated on a first come, first served basis wherein no fairness is enforced, each ingress queue of an activated logical channel may have free buffers reserved for allocation on a pro rata basis to ensure some fairness, or each ingress queue of an activated logical channel may be assigned a maximum number of free buffers that may be allocated to ensure some fairness. Regardless of how the free buffers of the common region 110 are allocated, buffers that would not be used under prior schemes are made available for use.

According to the present embodiment, free buffers from the common region 110 are not reserved for allocation and are only allocated when needed. When the number of free buffers available for allocation is above a predetermined threshold, e.g. eighty percent of the number $B_{free}$, each ingress queue may be allocated as many free buffers as required. To ensure fairness when the number of unallocated free buffers drops below the predetermine threshold, a maximum number $N_{freen}$ of free buffers are specified for the ingress queue of each activated logical channel, wherein the number $N_{freen}$ is determined in view of the maximum rate of transmission and the actual usage of the corresponding logical channel. According to alternative embodimetns, the number $N_{freen}$ for each activated channel indicates a number of bytes, rather than buffers.

Because the actual usage of a logical channel changes over time, the number $N_{freen}$ changes dynamically over time. For relatively low traffic logical channels, the number $N_{freen}$ may be equal to zero. If the aggregate of the numbers $N_{freen}$ for all of the activated logical channels exceeds the number of free buffers $B_{free}$, the number $N_{freen}$ for each ingress queue will be prorated by the quotient of $B_{free}$ divided by the aggregate of the numbers $N_{freen}$. Servicing engine 80 determines the number of reserved buffers $N_{freen}$ for each activated channel.

As logical channels are activated and deactivated, the allocation of buffers of the common region 110 will vary dynamically. For example, as new logical channels are activated, the size of common region 110 shrinks, and the maximum number of free buffers that may be allocated to a particular logical channel may be proportionally reduced. Servicing engine 80 performs the function of dynamically reapportioning use of the common region 110 whenever logical channels are activated and deactivated.

Figure 8:
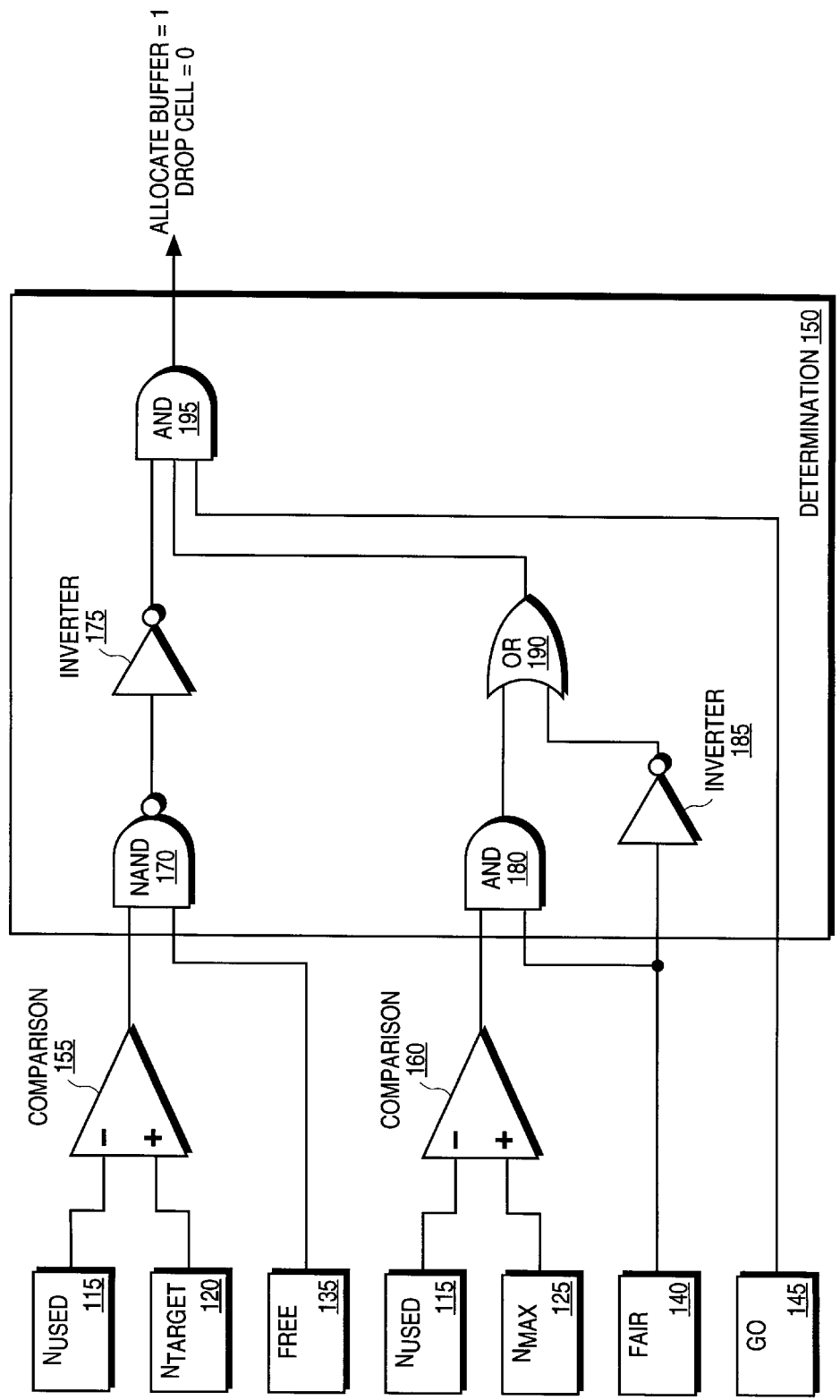
FIG. 8 is a representation of how queuing engine may use the queuing parameters to determine whether to allocate additional buffers to a buffer queue.

FIGS. 7 and 8 show a possible implementation to enable usage of the ingress buffer pool as described above. FIG. 7 shows a set of queuing parameters of one embodiment as including a queue depth field 115, a target queue depth field 120, a maximum queue depth field 125, and other queuing parameters 130. The queue depth field 115 stores a number $N_{used}$ that represents the actual number of buffers currently allocated to the corresponding ingress queue. Queuing engine 70 increments the number $N_{used}$ whenever a buffer is added to the corresponding ingress queue, and servicing engine 80 decrements the number $N_{used}$ whenever a buffer is removed from the corresponding ingress queue. Target queue depth field 120 stores a value $N_{target}$ representing the number of buffers reserved for allocation for the corresponding ingress queue, wherein the value $N_{target}$ is equal to the sum of $N_{fixed}$ and $N_{rsvd}$. Maximum queue depth field 125 stores a value $N_{max}$ representing the maximum number of buffers that may be allocated to the ingress queue. The other parameters 130 may include congestion control parameters that represent discard eligibility or congestion. Servicing engine determines the values of $N_{target}$ and $N_{max}$ in view of the considerations detailed above.

FIG. 8 is a block diagram showing a manner in which queuing engine 70 may use queuing parameters 87 to determine whether to allocate buffers. Queuing engine 70 makes a determination 150 in response to having a cell to store in an ingress queue. As shown, the determination 150 is made according to the present embodiment in response to the state of the common region 110 of the buffer memory space (as represented by a FREE flag 135, a FAIR flag 140, and a GO flag 145) and the queuing parameters of the selected ingress queue as represented by $N_{used}$ 115, $N_{target}$ 120, and $N_{max}$ 125.

The FREE flag 135 is set to a logic one to indicate that the memory space of ingress buffer pool 75 includes a common region 110 when a number of buffers remain free after the process of reserving buffers for allocation has been completed. The FREE flag 135 is set to a logic zero if all logical channels are activated. Typically, the value of the FREE flag 135 is changed only when the configuration of the ingress circuit 50 and the number of activated logical channels is changed.

The FAIR flag 140 is set to a logic one to indicate that fairness will be imposed when allocating free buffers from the common region 110, which means that the number $N_{max}$ stored by the maximum queue depth field will determine the maximum queue length for the ingress queue. The FAIR flag 140 is set to a logic one upon determining that a predetermined threshold of buffers from the common region 110 have been allocated. The FAIR flag 140 is set to a logic zero if less than the predetermined threshold of buffers have been allocated. The predetermined threshold, as discussed above, may be a function of the number of buffers in the common region 110 that remain free for allocation (e.g. $0.8B_{free}$). The threshold for resetting the FAIR flag 140 to a logic zero may be higher than threshold for setting the FAIR flag 140 to logic one (e.g. $0.9B_{free}$ to reset if the threshold to set the FAIR flag is $0.8B_{free}$). The reason for the difference in thresholds is that a frame of data is segmented into multiple cells, and the cells of a frame should not be buffered unless there is sufficient space to buffer all cells for the frame. The FAIR flag 140 initially has a logic zero value.

The GO flag 145 is set to logic one to enable the allocation of buffers and to a logic zero to disable the allocation of buffers. The GO flag 145 is set in view of the overall usage of the common region 110 and is set to a logic zero should the overall number of buffers in the common region 110 drop below another threshold value. The threshold values for setting and resetting the GO flag 145 should be significantly lower than those for setting and resetting the FAIR flag 140. For example, the threshold to set the GO flag 145 to logic zero may be $0.1B_{free}$, and the threshold to set the GO flag 145 to logic zero is $0.2B_{free}$. The GO flag 145 is initially set to be a logic one to enable buffer allocation.

The determination 150 is shown as comprising a number of logical functions that are performed using FREE flag 135, FAIR flag 140, GO flag 145, $N_{used}$ 115, $N_{target}$ 120, and $N_{max}$ 125. The inclusion of logic gates in FIG. 8 is intended to provide a graphical representation of the rules for performing determination 150 as described in more detail below, and no such logic gates are required to perform determination 150. Furthermore, the logical functions may be performed in parallel and may not necessarily be conditioned upon one another in the manner illustrated and implied by FIG. 8.

The FREE flag 135, the FAIR flag 140, and the GO flag 145 are the primary factors in determining the outcome of determination 150. For example, if the GO flag 145 is set to a logic zero, the cell will be dropped, and there is no need to retrieve the queuing parameters for the selected ingress queue. Similarly, if the FREE flag 135 and the GO flag 145 are set to logic ones and the FAIR flag is set to a logic zero, the outcome of determination 150 is automatically to allocate a buffer, and there is no need to retrieve the queuing parameters for the selected ingress queue.

If FREE flag 135 is set to a logic zero, however, queuing engine 70 performs a comparison 155 between $N_{used}$ 115 and $N_{target}$ 120, and it is the outcome of comparison 155 that defines the outcome of determination 150. For example, if $N_{used}$ 115 is less than $N_{target}$ 120, a buffer will be allocated, and if $N_{used}$ 115 is greater than $N_{target}$ 120, the cell will be dropped.

Similarly, if the FAIR flag is set to a logic one and the FREE flag is set to a logic one, queuing engine 70 performs a comparison 160 between $N_{used}$ 115 and $N_{max}$ 125, and it is the outcome of comparison 160 that defines the outcome of determination 150. For example, if $N_{used}$ 115 is less than $N_{max}$ 125, a buffer will be allocated, and if $N_{used}$ 115 is greater than $N_{max}$ 125, the cell will be dropped.

Figure 9:
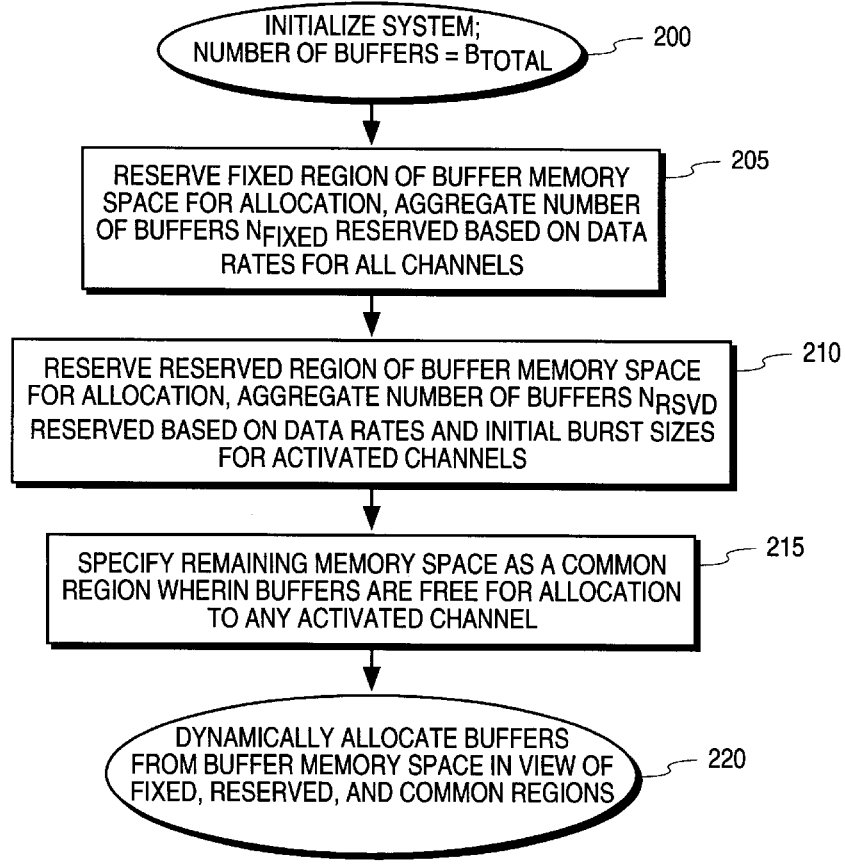
FIG. 9 is a flow chart showing a method for enabling the dynamic allocation of buffer memory of one embodiment.

FIG. 9 summarizes the above discussion. At process block 200, the system (e.g. the ingress circuit 50) is initialized wherein the size of the buffer memory space is fixed at $B_{total}$. Again, the size of the memory space is primarily determined by the aggregate rate of transmission for the plurality of channels and expected communications traffic. At process block 205, a fixed region is reserved in the buffer memory space wherein the size of the fixed region is determined by the data rates for all of the channels, whether activated or deactivated. Again, the fixed region provides for a minimum allocation of buffers should a previously deactivated logical channel become activated. At process block 210, a reserved region is reserved in the buffer memory space wherein the size of the reserved region is determined by the data rates and IBS of only the activated channels. If IBS is used to calculate the size of the reserved region, the size of the reserved region may fluctuate over time because the IBS is dynamically variable. At process block 215, any remaining area of the buffer memory space is specified as a common region wherein buffers may be freely allocated to any activated channel. At process block 220, buffers are dynamically allocated in view of the fixed, reserved, and common regions.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for managing buffer memory in a communications controller that transmits data over a plurality of channels, wherein the buffer memory has a memory space of $B_{total}$, the method comprising:

reserving a first subset of the memory space $B_{total}$ for allocation to queues associated with each of the plurality of channels based on an aggregate rate of data transmission over the plurality channels such that each queue is provided a minimum reservation of memory space based on a rate of data transmission for an associated channel;

reserving a second subset of the memory space $B_{total}$ for allocation to queues associated with channels that are activated to transmit data; and specifying any remaining memory space of the memory space $B_{total}$ as free for allocation to any queue associated with a channel that is activated to transmit data.

2. A method for managing buffer memory in a communications controller that transmits data over a plurality of channels, wherein the buffer memory has a memory space of $B_{total}$, the method comprising:

reserving a first subset of the memory space $B_{total}$ for allocation to queues associated with each of the plurality of channels based on an aggregate rate of data transmission over the plurality channels such that each queue is provided a minimum reservation of memory space based on a rate of data transmission for an associated channel;

reserving a second subset of the memory space $B_{total}$ for allocation to queues associated with channels that are activated to transmit data based on an aggregate rate of data transmission over activated channels and an aggregate of initial burst size for activated channels such that each queue associated with an activated channel is provided a reservation of memory space based on a rate of data transmission and an initial burst size of an associated activated channel; and specifying any remaining memory space of the memory space $B_{total}$ as free for allocation to any queue associated with a channel that is activated to transmit data.

3. The method of claim 1, further comprising allocating memory space from the first subset, the second subset, and the remaining memory space, as needed, to each queue associated with an activated channel.

4. The method of claim 3, wherein all of the plurality channels are activated such that a sum of the first and second subsets is equal to $B_{total}$, the step of allocating memory space being limited to allocating memory space only from the first and second subsets of buffers.

5. The method of claim 3, wherein the step of allocating memory space is limited such that each activated channel has an associated maximum number of bytes from the remaining memory space that may be allocated to its associated queue.

6. A method for managing buffer memory space in a communications controller that transmits data over a plurality of channels, wherein a size of the buffer memory space is based on an aggregate rate of transmission for the plurality of channels, comprising:

reserving a fixed region of the buffer memory space for allocation to buffer queues associated with each of the plurality of channels such that a minimum number of buffers is reserved for allocation to each buffer queue;

reserving a reserved region of the buffer memory space for allocation to only those buffer queues associated with channels that are activated to transmit data wherein a size of the reserved region is varied dynamically in response to initial burst sizes of channels that are activated to transmit data; and specifying any remaining buffers as being in a common region of the buffer memory space wherein the remaining buffers are free for allocation to any buffer queue associated with a channel that is activated to transmit data if less than all of the channels are activated for transmission.

7. The method of claim 6, further including providing a distinct set of queuing parameters each buffer queue associated with an activated channel, each set of queuing parameters including a target queue depth value based on a number of buffers reserved for allocation for the buffer queue from the fixed and reserved regions.

8. The method of claim 7, further including determining whether to allocate a buffer to a particular buffer queue by comparing the target queue depth value to an actual queue depth value if the fixed and reserved regions comprise all of the memory space.

9. The method of claim 6, further including providing a distinct set of queuing parameters each buffer queue associated with an activated channel, each set of queuing parameters including a maximum queue depth value based on a number of buffers reserved for allocation for the buffer queue from the fixed and reserved regions and a maximum number of buffers available for allocation to that buffer queue from the common region.

10. The method of claim 9, further including determining whether to allocate a buffer to a particular buffer queue by comparing the maximum queue depth value to an actual queue depth value.

11. A communications controller for transmitting data from a first system to a second system via a plurality of channels, comprising:

a buffer pool partitioned into a fixed region, a reserved region, and a common region, wherein buffers from the fixed region are reserved for allocation to buffer queues associated with each of the channels, buffers from the reserved region are reserved for allocation to buffer queues associated with channels activated for transmission wherein a size of the reserved region is varied dynamically in response to initial burst sizes of channels that are activated to transmit data, and the common region comprises any remaining buffers that are free for allocation to any buffer queue; and a queuing processor coupled to receive data from the first system and store the data in the buffer queues;

a servicing processor coupled to transmit data from the buffer queues to the second system; and a distinct set of queuing parameters for each buffer queue maintained by the servicing processor, the queuing processor using the queuing parameters to allocate buffers to buffer queues, the servicing processor using the queuing parameters to service the buffer queues.

12. The method of claim 2, further comprising allocating memory space from the first subset, the second subset, and the remaining memory space, as needed, to each queue associated with an activated channel.

13. The method of claim 12, wherein all of the plurality channels are activated such that a sum of the first and second subsets is equal to $B_{total}$, the step of allocating memory space being limited to allocating memory space only from the first and second subsets of buffers.

14. The method of claim 12, wherein the step of allocating memory space is limited such that each activated channel has an associated maximum number of bytes from the remaining memory space that may be allocated to its associated queue.

* * * * *